No. 851,432. PATENTED APR. 23, 1907.
J. O'LEARY.
BRAKE SHOE ATTACHMENT FOR AUTOMOBILES, &c.
APPLICATION FILED FEB. 27, 1906.

Witnesses.
Robert Everett.

Inventor:
John O'Leary,
By James L. Norris.
Att'y

UNITED STATES PATENT OFFICE.

JOHN O'LEARY, OF COHOES, NEW YORK.

BRAKE-SHOE ATTACHMENT FOR AUTOMOBILES, &c.

No. 851,432.   Specification of Letters Patent.   Patented April 23, 1907.

Application filed February 27, 1906. Serial No. 303,266.

*To all whom it may concern:*

Be it known that I, JOHN O'LEARY, a citizen of the United States, residing at Cohoes, in the county of Albany and State of New York, have invented new and useful Improvements in Brake-Shoe Attachments for Automobiles and the Like, of which the following is a specification.

This invention relates to attachments for automobiles or motor cars and other vehicles, and consists of brake shoes disposed to cooperate with the rear wheels and be thrown down in advance of and close to the latter, and also raised out of braking position through the medium of controlling means or devices arranged in the body of the car and within easy reaching distance of the driver or chauffeur.

The attachment also includes a fender automatically cooperating with the front of the car and similar in construction, as a matter of illustration, to that disclosed in my Letters Patent Number 792,920, dated June 20, 1905, and having connecting means with respect to the brake shoe controlling devices arranged in the body of the car and by which an automatic operation of the brake shoes with relation to the rear wheels may be set up when the fender is struck.

The attachment also includes a connecting device between a portion thereof and the power generating mechanism to also automatically shut off the motor or the motive medium.

The purpose of the improved attachment is to equip an automobile or motor car with a life guard means and whereby the fender will obstruct the passage of the car over human beings, the brake shoes checking the speed or momentum of the car and the motor or motive medium simultaneously controlled without requiring any operation or manipulation by the driver or chauffeur, with material advantages in the propulsion of an automobile or motor car.

Figure 1:
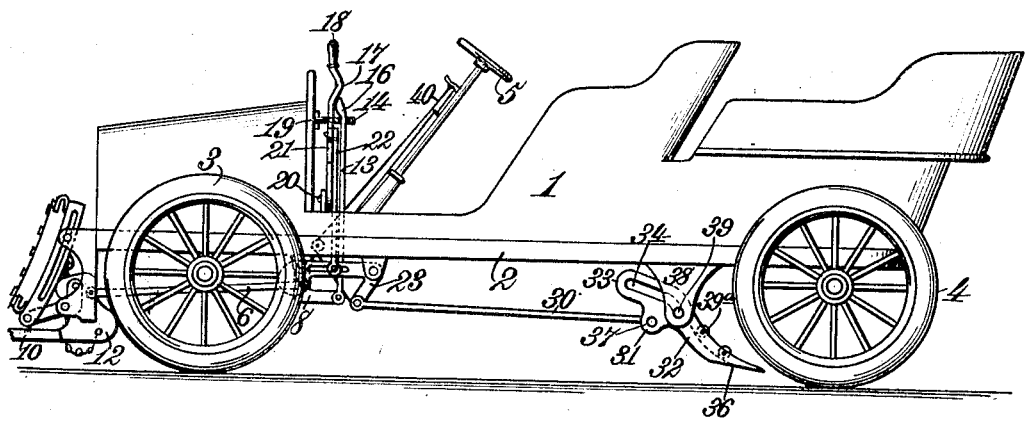
Figure 2:
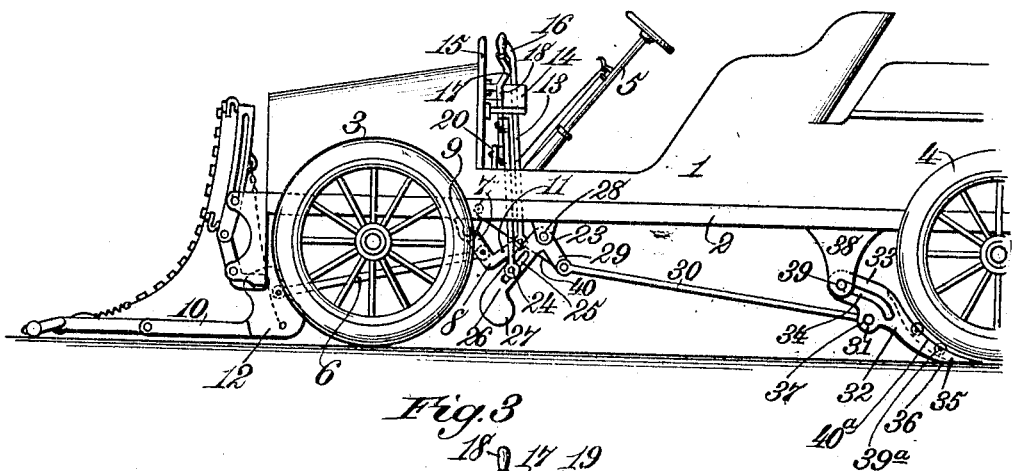
Figure 3:
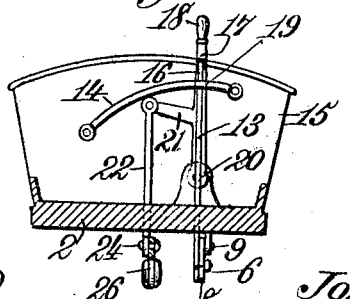

A preferred form of the improved attachment will be hereinafter set forth in detail to illustrate one practical organization of the invention, reference being had to the accompanying drawings, in which:

Figure 1 is a side elevation of an automobile or motor car embodying the features of the invention, and illustrating the fender elevated in traveling position, and the brake shoes raised, only such parts of the motor car being illustrated as are necessary to demonstrate the practicability of the improved attachments. Fig. 2 is a view similar to Fig. 1, showing the fender fully lowered and the brake shoes down in contact with the rear wheels. Fig. 3 is a detail elevation looking towards the inner side of the dash of an automobile or motor car to illustrate the positions and relation of the several lever controlling devices.

Similar numerals of reference are employed to indicate corresponding parts in the several views.

The numeral 1 designates an automobile or motor car of any preferred form, having a bed 2, and front and rear pairs of wheels 3 and 4, mounted as usual. The front pair of wheels 3 is controlled by a steering bar 5, having a suitable hand wheel and located within easy reaching distance of the seat of the driver, as shown.

To the front of the car and suitably attached thereto is an automatically operating fender, similar in construction to that disclosed in Letters Patent No. 792,920, granted to me June 20, 1905, and embodying, among other elements, side bars 10, having weighted heels 12, the side bars having attached thereto suitable means for holding an object or person that may be struck and fall rearwardly into the fender. The side bars 10 also have an automatic lowering movement, as clearly explained in the patent aforesaid, and the weighted heels 12 project a greater distance rearward when the said side bars 10 are lowered, as shown by Fig. 2, than when elevated in normal traveling position, as shown by Fig. 1. To one of the heels 12 the forward end of a connecting arm 6 is attached, said arm extending rearwardly any suitable distance and also attached to the vertical member 7 of a bell crank lever 8, the upper end of the vertical member 7 being fulcrumed to the bed 2, as at 9, and having its lower substantially horizontal member 11 movably attached to the lower end of an automatically operating lever 13. The lever 13 extends upwardly through the bed 2 of the automobile, and also through a guide 14 projecting rearwardly from the dash 15. The upper extremity of the lever 13 is directed or bent forwardly, as at 16, and is normally held in contact with the lower portion of a cam projection 17, on the upper extremity of a release lever 18, which has an arcuate movement across or transversely with respect to the dash 15, or, in other words, said lever 18 operates in a side-wise direction. The lever 18 is normally held in a notch 19 formed in a portion of the guide 14, said lever having sufficient play in its mounting to permit it to be pressed forwardly or out of engagement with the notch 19 by the upper extremity 16 of the lever 13 moving over the cam projection 17. The lower extremity of the lever 18 is fulcrumed on the bed, as at 20, and integrally formed therewith is a laterally projecting arm 21, movably attached to the upper extremity of a brake shoe lever 22, fulcrumed loosely with relation to a weighted brake shoe controlling lever 23. The brake shoe lever 22 extends downwardly and is free to move in the bed 2, and has a bolt or pin 24 in its lower extremity slidably engaging a longitudinally disposed slot 25, in an elongated arm 26 of the weight lever 23, said arm 26 having its forward extremity weighted, as at 27. The fulcrum for the weight lever 23 is located at the rear extremity of the latter, as indicated by 28, and from the said fulcrum an angle arm 29 depends and is considerably shorter than the arm 26. The weight lever 23 may be properly termed a brake shoe controller, as it automatically operates to pull downwardly on the lever 22 and through the latter pulls over the lever 18, the weight of the controller 23 being such, and the arms 26 and 29 having such proportionate length, that the automatic depressing operation of the said controller 23, lever 22 and the lever 18, when the latter is released, will positively be effected. When the lever 22 depresses through the operation of the lever 18 the bolt or pin 24 is shifted forwardly in the slot 25, and the controller 23 assumes the position shown by Fig. 2. When the parts are in normal position, or the lever 18 is pulled up vertically and caused to engage the notch 19, the parts will be in a position as shown by Fig. 1, with the weight of the controller 23 imposed on the lower end of the lever 22 and ready for instant operation the moment the lever 18 is released automatically, as hereinbefore explained.

To the lower end of the shorter arm 29 of the controller 23, a suitable connecting device, such as a rod, or other analogous element, 30 is attached and at its rear end is secured to an ear or boss 31, forming part of one of a pair of brake shoes 32, having upper shanks or body members 33, provided with arcuate slots 34, one slot being formed in each shank or body member. The lower wheel engaging members 35 of the brake shoes are so shaped as to snugly fit under the lower forward portions of the wheels 4, so that the said wheels may rotate for a time on the upper edges of the shoes, and when the bottom edges 36 of said shoes are thrown into forceful contact with the ground surface to check the momentum or speed of the car or automobile. The shoes 32 are united by a cross rod 37 for a simultaneous operation, said cross rod being connected to the ears 31. In suitable hangers 38 depending from opposite sides of the bed 2 adjacent to the rear wheels 4, a suspending rod 39 is fixed and is passed through the arcuate slots 34 of the shoes to insure a synchronous and regular movement of the shoes. The shoes 32 also have antifrictional rollers $39^a$ in their upper edges between side flanges $40^a$, shown in dotted lines, to ease the movement of the rear wheels on the said shoes.

A cord, chain, or analogous device 40 is also attached to the shorter arm 29 of the controller 23, and runs to a suitable portion of the starting and stopping device or mechanism of the motor or may connect with a valve controlling the supply of motive medium. This cord or pull device 40 will have an operation simultaneous with that of the controller and fender and brake shoes, with obvious advantages in checking the speed or momentum of the car or automobile.

From the foregoing, the operation of the attachment will, no doubt, be understood, but it is deemed expedient to briefly give a summary of the same, and which is as follows: Normally, the several attachments, including the fender and brake shoes, as well as the controller, will be in the position shown by Fig. 1. When the fender is struck, the bars 10 and heels 12 will be thrown downwardly, and the said heels will move rearwardly, thus forcing the arm 6 backwardly and correspondingly moving the bell crank lever 8 and cause the lower arm of the latter to rise and push upwardly on the lever 13. This lever 13, by its rising movement, will disengage the release lever 18 from the notch 19, and as soon as said lever 18 is free, it will fall over side-wise and depress the lever 22 and simultaneously the longer arm 26 of the controller 23, throwing the shorter arm 29 of said controller rearwardly, which will institute a pull on the cord, chain or other device 40, and also permit the brake shoes 32 to lower and all the attachments assume the position shown by Fig. 2. To restore the parts to normal position, as shown by Fig. 1, it is only necessary to pull the lever 18 over to the right side, as considered from the position of the parts as illustrated by Fig. 3, and until the said lever is caught and held in the notch 19 with the rear edge of its upper extremity in contact with the similar extremity of the lever 13.

Having thus described the invention, what is claimed, is:

1. The combination with an automobile or motor car, of a fender, sliding brake shoes for engagement with a portion of the wheels and the ground surface under the wheels, the shoes being connected to the fender, and means for automatically lowering the fender and brake shoes and including a weighted controller.

2. The combination with an automobile or motor car, of a fender, brake shoes to engage a portion of the wheels and the ground surface, a connecting device for the motor mechanism of the car, and means automatically operating when the fender is struck to depress the brake shoes and shut off the motor mechanism.

3. An automobile or motor car having an automatically operating fender, brake shoes to engage a portion of the wheels of the car and the ground surface, and connections between the fender and brake shoes for automatically disposing the latter in braking position when the fender is lowered and including a weighted controller at a distance from the fender and shoes.

4. An automobile or motor car having an automatically operating fender, brake shoes to engage a portion of the wheels of the car and the ground surface, connecting devices between the fender and brake shoes to dispose the latter in braking position simultaneously with the depression of the fender, and means for stopping the motor and connected to a part of said devices.

5. An automobile or motor car having an automatically operating fender, brake shoes cooperating with a portion of the wheels of the car and the ground surface, and connections between the fender and brake shoes and including a weighted controller at a distance from both the fender and shoes to dispose the said brake shoes in braking position with respect to the wheels simultaneously with the depression of the fender.

6. An automobile or motor car having an automatically operating fender, brake shoes disposed in cooperative relation to the rear wheels of the car, a release lever operated by the movement of the fender, a brake shoe lever connected to and actuated by the release lever, a weighted controller to which the lower end of the brake shoe lever is movably attached, and a connection between the said controller and the brake shoes.

7. An automobile or motor car having a fender, brake shoes disposed in cooperative relation to the rear wheels of the car and adapted to engage the ground surface and slidably disposed on a fixed support, and connecting devices between the fender and brake shoes for simultaneously lowering the said shoes when the fender is lowered, said connecting devices having a weight device at an intermediate point.

8. An automobile or motor car having a fender, slidable brake shoes cooperating with the rear wheels of the car and adapted to contact with the ground surface, means attached to the motor controlling mechanism to shut off the latter, and connecting devices between the fender, brake shoes and said means for causing the latter and the brake shoes to operate simultaneously with the movement of the fender.

9. An automobile or motor car having a movable fender, weight means cooperating with said fender to cause it to automatically gravitate, a connection with the motive mechanism of the car for shutting off the latter, and devices interposed between the fender and the connection for causing the latter to be operated simultaneously with the movement of the fender.

10. An automobile or motor car having slidable brake shoes disposed to cooperate with the rear wheels thereof and adapted to bear on the ground surface, a connection with the motive mechanism of the car for shutting off the latter, and devices cooperating with and connecting the brake shoes and said motive mechanism connection for simultaneously throwing the shoes into braking position with the shutting off of the motor.

11. The combination with an automobile or motor car, of longitudinally slidable slotted brake shoes disposed in cooperative relation to the rear wheels thereof, a fixed support on which said shoes are movably held, and means for releasing and causing an automatic application of said brake shoes.

12. The combination with an automobile or motor car, of longitudinally slidable brake shoes in cooperative position with relation to the rear wheels of the car, an intermediate weighted controller connected to said brake shoes, and lever devices cooperating with said controller, one of the lever devices by its movement operating the remaining lever device.

13. The combination with an automobile or motor car, of slidable brake shoes arranged in cooperative relation with respect to the rear wheels thereof and adapted to contact with the ground surface, an intermediate weighted controller connected to the brake shoes, a lever attached to said controller, and a lever for actuating said controller lever.

14. The combination with an automobile or motor car, of brake shoes disposed in cooperative relation to the rear wheels thereof, an intermediate weighted controller having a slot therein and connected to the said shoes, a lever having its lower extremity engaging said slot of the controller, and means for actuating the said lever.

15. The combination with an automobile or motor car, of brake shoes having slotted shanks and operatively suspended adjacent to the rear wheels of the car, a fixed support on which said brake shoes are mounted the said shoes being longitudinally slidable, and means connected to the shoes for operating the same.

16. The combination with an automobile or motor car, of brake shoes disposed in operative relation to the rear wheels thereof, and provided with slots, fixed means engaging the said slots and suspending the shoes, and means connected to the shoes for operating the same.

In testimony whereof I have hereunto set my hand in presence of two subscribing witnesses.

JOHN O'LEARY.

Witnesses:
 EDWIN DWIGHT STILES,
 WILLIAM LA BARGE.